UNITED STATES PATENT OFFICE.

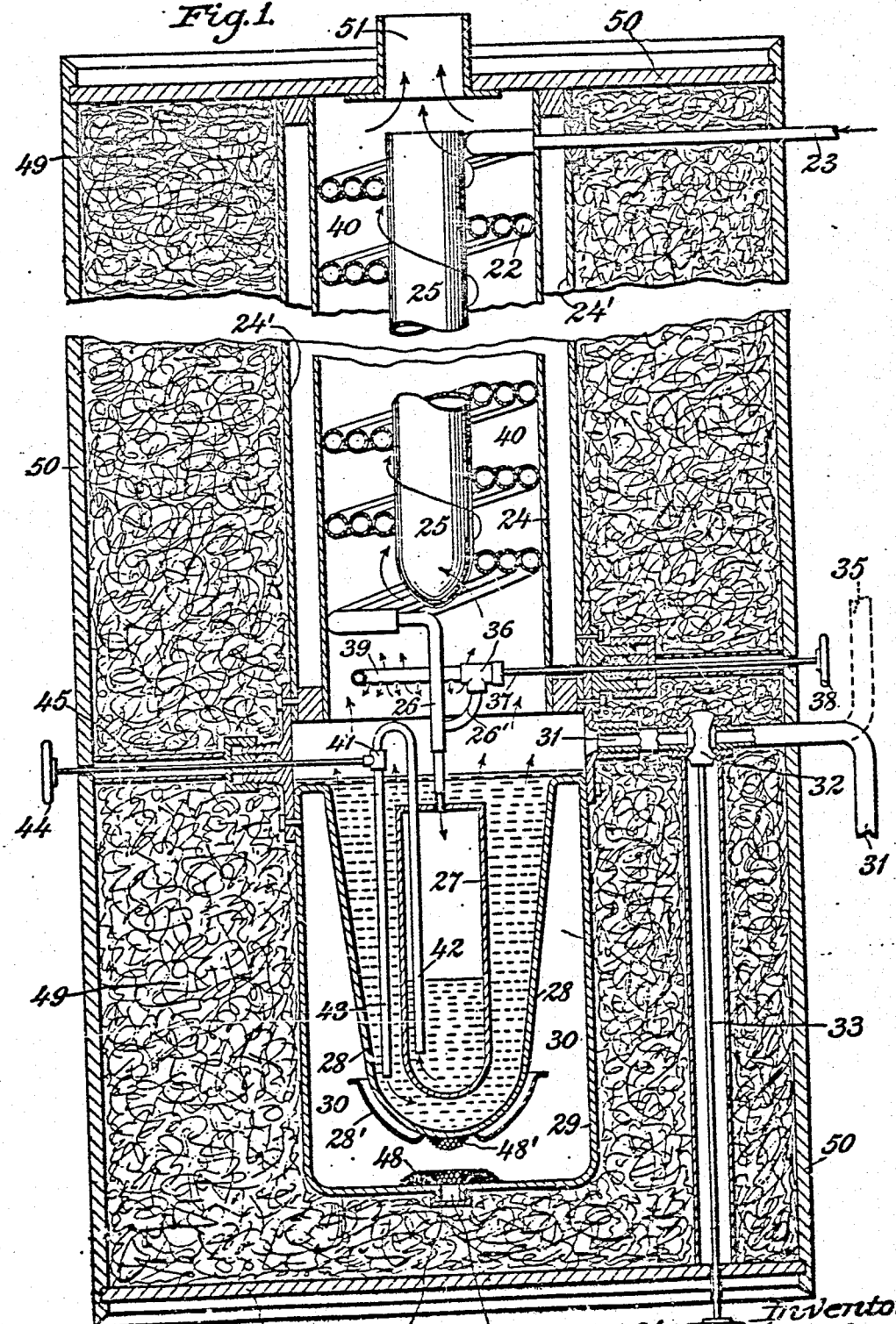

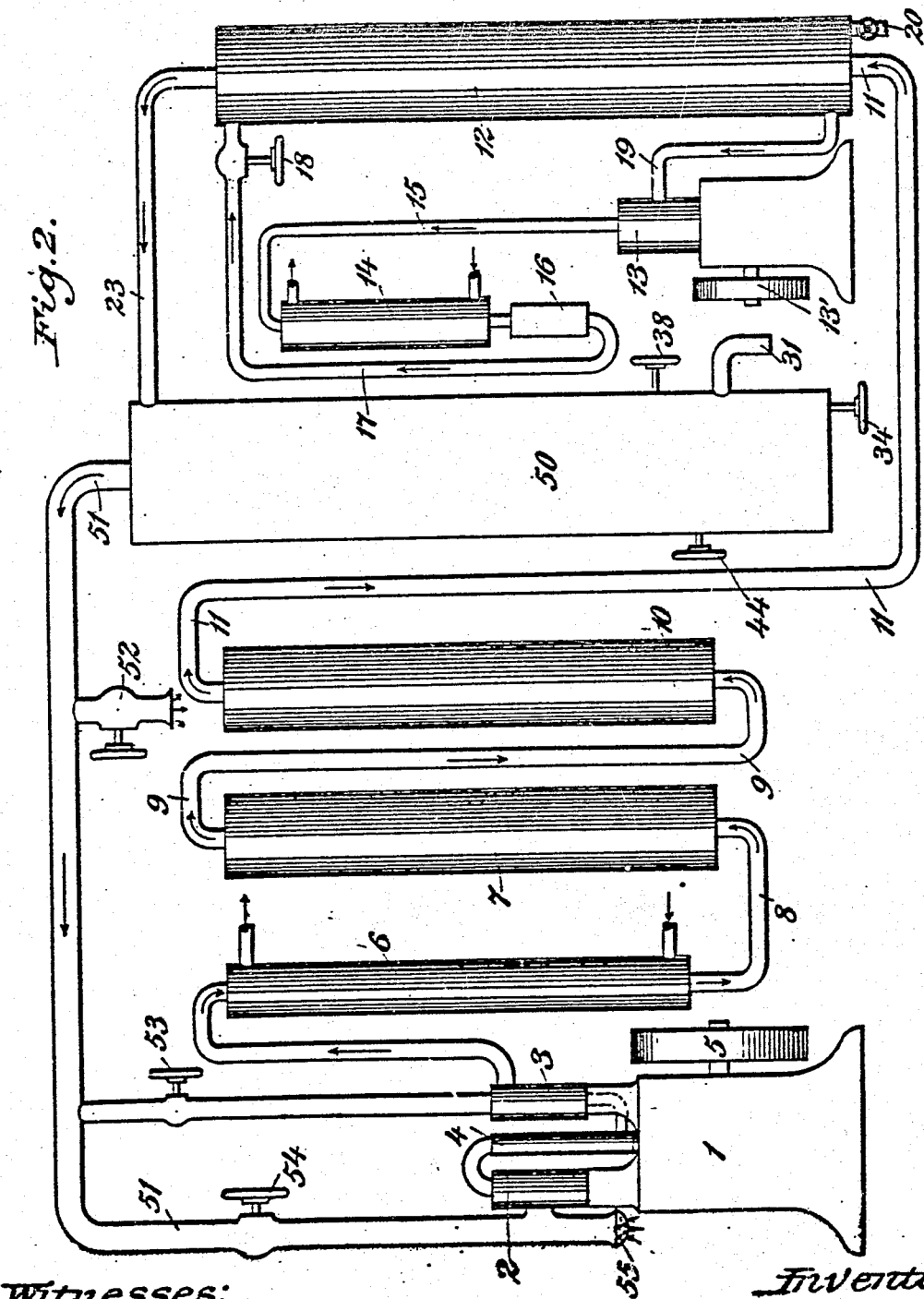

JAMES F. PLACE, OF GLENRIDGE, NEW JERSEY, ASSIGNOR TO AMERICAN AIR LIQUEFYING CO., A CORPORATION OF NEW YORK.

AIR-LIQUEFIER.

No. 927,594.    Specification of Letters Patent.    Patented July 13, 1909.

Application filed September 11, 1906. Serial No. 334,104.

*To all whom it may concern:*

Be it known that I, JAMES F. PLACE, a citizen of the United States, and a resident of Glenridge, in the county of Essex and State of New Jersey, have invented certain new and useful Improvements in Air-Liquefiers, of which the following is a specification.

My invention relates to improvements in apparatus for liquefying atmospheric air.

The object is to produce liquid air at less expenditure of energy than heretofore, and thereby reduce the cost of its production. I attain this object in the manner herein described and as illustrated by the accompanying drawings, in which—

Figure 1 is a vertical section, showing the liquefier and other accessories connected therewith. Fig. 2 is a diagrammatic drawing showing the necessary mechanism and connection for compressing, cooling and drying the air previous to its admission to the counter-current coils and the liquefier.

Similar reference marks refer to similar parts throughout the several drawings.

At the numeral 1 in Fig. 2, I show an ordinary air compressor, shown preferably as a two-stage compressor, having the low-pressure cylinder 2 and the high-pressure cylinder 3 with the inter-cooler 4 between. At 5 is shown a wheel to which power may be connected by belt. At 6 is shown an ordinary water-cooler for removing the heat of compression.

It is very necessary in liquefying air that all moisture in the air be removed, otherwise frost and ice will form in and clog the pipes. So also must the carbonic acid gas be removed from the air, otherwise it remains not only to clog the pipes but comes out with the liquefied air in form of frozen liquid carbon dioxid; and oftentimes in such quantities as to be troublesome to remove. I use preferably calcium chlorid to remove a portion of the moisture from the air, and then caustic potash to remove more moisture and to also absorb the carbonic acid gas ($CO_2$) from the air. I then subject the air to a freezing process by mechanical refrigeration, to freeze out any remaining moisture which may be in it. In my experience I find that the calcium chlorid and caustic potash, if the drums are properly constructed, will take air at ordinary saturation of 75% or higher, and reduce the moisture to 14% saturation. This method of removing moisture and $CO_2$ from the air is not new, but some of the appliances for doing the work are new and their novel construction is new, Letters Patent for which I have made application.

I show my calcium chlorid moisture extractor at 7, in form of a vertical drum charged with lump calcium chlorid, the air entering same through the pipe 8 from the cooler 6, and passing out of the drum through the pipe 9. Thence it enters a similar drum 10, which is charged with caustic potash in the lump. After thus being chemically dried and the $CO_2$ gas being absorbed by the caustic potash, I pass the air through the pipe 11 to a refrigerating drum 12. This drum (12) is of novel construction inside. The refrigeration is produced in the usual manner, either with ammonia or carbon dioxid, preferably the latter. I show at 13 a $CO_2$ gas compressor (power being supplied thereto by belting to the wheel 13') which discharges into the water cooling condenser 14 through the connecting pipe 15.

The highly compressed $CO_2$ gas is condensed to a liquid in the condenser 14, which drops by gravity into the liquid holding tank 16. From thence the liquid $CO_2$ is conducted through the pipe 17 to the pressure releasing or expansion valve 18. It passes through a copper coil in the drum 12, in counter-current to the compressed air delivered from the pipe 11. The $CO_2$ liquid released from pressure evaporates in the copper coils, and the gas is delivered to the $CO_2$ compressor again through the pipe 19, and is re-compressed and condensed as before. A temperature of $-30°$ to $-40°$ F. can easily be obtained in this way, and the remaining moisture in the compressed air will be deposited on the $CO_2$ copper coils in the drum 12, and subsequently melted and drained off through the drip cock 20. The air is now ready for liquefying, and is delivered to the thermal interchanger and my improved submerged liquefier or high-pressure air-liquefying condenser, hereinafter described.

The usual method of liquefying air, is to utilize the cooling effect produced by what is known as the throttled nozzle and counter-current thermal interchanger system. Air is compressed to a high tension (to 100 and often to 200 atmospheres), and then released, often to atmospheric pressure. In this way "the Joule-Thompson effect," so called, is utilized, in accordance with the well-known formula: $\frac{P^1-P^2}{4}\left(\frac{289}{T}\right)^2$ = the fall in temperature in centigrade degrees; wherein $P^1$ is the pressure in atmospheres before expansion, $P^2$ the pressure after expansion, and T the absolute temperature of the air before expansion, in centigrade. The cooling effect obtained by expanding air through a throttled nozzle from a constant relatively high to a constant relatively low pressure, is about half a degree Fah. per each atmosphere released—increasing somewhat as the initial temperature falls and the initial pressure is increased. After release, the low pressure air is carried back in a counter-current thermal interchanger over the high-pressure air-supply pipes, further reducing the temperature of the initial air before release by the nozzle, and thus producing a cumulative fall in temperature of the released air, until the temperature of liquefaction for air at the lower pressure is reached, when about 7% of the air liquefies; the latent heat of condensation given out and the reduction in quantity of the gaseous air carried back for cooling the incoming high-pressure supply, neutralizes any higher percentage of liquefaction. Another and older method is that of expanding the air in an insulated air-expansion engine, and using the exhaust air from the engine by a similar counter-current thermal interchanger to cool the compressed air supplied to the same. This method gives a very much greater fall of temperature per atmosphere expanded; and therefore not nearly so great an initial compression is required, which assures a very considerable saving in energy, besides the recovery of the power obtained from the expansion engine. Both of the foregoing methods are now in practical use. My present invention, however, is based on a different method from either of the foregoing. I utilize the latent heat of vaporization required by liquid air at substantially atmospheric pressure, to cool and liquefy air while at or above its critical pressure when there is no latent heat of condensation given out to neutralize refrigeration and retard liquefaction. It is well known that the critical pressure of air is 39 atmospheres, and its critical temperature is $-220°$ F. It will condense to a liquid at $-220°$ F., if it be compressed to 39 atmospheres; and it will liquefy at a lower compression if cooled to a lower temperature, or at atmospheric pressure if cooled to $-312.6°$ F.; but no amount of compression will cause liquefaction unless it be cooled to its critical temperature, namely, $-220°$ F. If compressed to 39 atmospheres and cooled to $-220°$ F., its density then as a gas is identical with its density as a liquid; and with the slightest lowering of the temperature then, its change of state from a gas to a liquid (if the pressure is maintained) is instantaneous, and there can be no latent heat of condensation, as there is practically no further contraction.

By my system I compress air to about 45 atmospheres (647 lbs. gage) and liquefy all of the air compressed, without any reduction of pressure. It is liquefied in a high-pressure condenser, which is kept substantially submerged in liquefied air of substantially atmospheric pressure, and after liquefaction it is sub-cooled as a liquid before release from pressure, until it is about the same temperature of the low-pressure liquid air surrounding the condenser, or $-313°$ F. Afterward it is released from pressure (as a sub-cooled liquid) and delivered to the insulated reservoir which surrounds the condenser, (thus replenishing the evaporating liquid-charge therein) to liquefy and sub-cool new and successive charges of cooled compressed air in the submerged condenser. The latent heat of vaporization required by liquid air at atmospheric pressure is about 120 B. t. u. per pound; and this, with the cooling effect of the vapor of the evaporated liquid (as it passes through the thermal interchanger and absorbs heat from the incoming compressed air until it rises from $-313°$ F. to normal temperature), is all utilized. In this way a large saving is made in power, for any compression above 45 atmospheres would be practically a waste of energy; and every pound of liquid air evaporated at atmospheric pressure will cool and liquefy about double the quantity of air compressed to or a trifle above the critical pressure (39 atmospheres), leaving liquefied about 50% of all the air compressed as the net output in liquid air, or the net product of the apparatus for outside or commercial uses. This system and my air-liquefying apparatus I will now proceed to describe.

Having thoroughly dried the compressed air and removed therefrom the $CO_2$ gas, I deliver the same to the counter-current cooling coils and liquefier, shown in Fig. 1, comprising for the high-pressure, one or more copper pipes 22 of suitable length, which carry the compressed air in (as received from the supply pipe 23, shown in Figs. 1 and 2) to the liquefier. These pipes 22 are in form of helical coils inclosed by the non-conducting insulated drum or longitudinal double walled conduit 24 and 24′. The center of this helical coil (22) is filled by the core or drum 25. By the construction shown, there is provided a low-pressure return passage 40, between the coils 22, within the conduit or drum 24, helically around the core 25, up, over and along the compressed air pipes 22; so that the outflowing expanded air or evaporated liquid air in the conduit 24 passes in counter-current to the inflowing compressed air in the coils 22. The helical coil 22 has an extension or pipe 26 at the lower end, which has an enlarged part, or the liquefier proper 27, made of copper, extending still farther down. This lower end 27, or air-liquefying condenser is inclosed by the liquid air holder 28, having a vacuum jacket 29 inclosing the vacuum 30 around the holder 28. The holder 28 is the lower end of the low-pressure conduit 24, and is made of suitable impervious metal of low thermal conductivity. The condenser 27 is kept constantly supplied with cooled compressed air from the pipes 22, at substantially the critical pressure; and this pressure is maintained in the condenser at all times. At 31 I show a liquid-discharging overflow outlet for the liquid air holder 28, regulated by the valve 32, which is operated by the long insulated non-conducting stem 33, and hand wheel 34. This overflow or outlet pipe is so arranged that it can be turned upward as shown by the dotted line 35, and used to charge the holder 28 with an initial charge of liquid air, in starting up.

At 41 I have a liquid discharging valve, the inlet to said valve being in form of a siphon 42, which extends to near the bottom inside of the submerged condenser 27, or so located that only liquefied air can be delivered from the condenser 27 to and through said liquid discharging valve 41. This liquid discharging valve delivers directly into the liquid air holder 28, through the downwardly extended discharge pipe 43. Valve 41 is operated by means of the hand wheel 44 and non-conducting insulated stem 45. At 46 I have an inlet to the vacuum space 30, to which an air pump may be attached. After producing a vacuum in 30, I fill the vacuum space with carbonic acid gas under slight pressure, and then seal with the soldered cap 47. Within the wire gauze 48 or 48', I put charcoal, to absorb any air which may be in the $CO_2$ gas; this charcoal is held by the gauze 48' in contact with the surface of the bottom of the holder 28, where the temperature is constantly very low; at extremely low temperatures charcoal has great power of absorbing air. On charging the vessel 28 through the pipe 35 with an initial charge of liquid air, the $CO_2$ gas in the space 30 will quickly condense and be deposited as $CO_2$ frost on the coldest surface of the vessel or holder 28, thus producing a high vacuum in said space and surrounding the liquid air in said vessel with the best possible insulation. At 28' I show a cup-shaped "catch" fixed around the bottom of the vessel 28, within the vacuum space 30, which is for the purpose of catching or holding any liquid $CO_2$ which may drip down on the surface of the vessel 28, thus holding said liquid $CO_2$ close to the cold surface of the vessel 28 so as to prevent it reëvaporating to a gas.

The space between the walls of the low pressure conduit 24 and 24' may be filled with eider-down or other suitable insulator; and the whole may be packed in hair felt 49, or some other suitable insulating packing, and inclosed by the non-conducting barrel 50.

The expanded or return flow of air leaves the interchanger by the pipe or conduit 51, and may be returned to the compressor and re-compressed, by closing the valves 52 and 53, (see Fig. 2) and opening valve 54; or by closing 53 and 54 and opening valve 52, it will be discharged to the open air.

An important and novel feature of my invention is the location of the liquefier proper or high-pressure condenser 27, within the liquid air vessel or holder 28; and making of that condenser a closed drum, as it were, so that only compressed air of high tension (to or above its critical pressure) fills it, and without current or flow therein, as all the air supplied to it becomes liquefied; therefore the only delivery of compressed air thereto is to take the place of that which has become liquefied therein while at substantially its critical pressure; and no air can escape therefrom until after it is liquefied. By having this condenser 27, located as shown, it is submerged in the liquid air in the vessel or holder 28, at all times, whether the holder has therein an initial charge of liquid air, or whether it is supplied with liquefied air from the condenser 27. The liquefied air as it accumulates in the condenser or liquefier 27, may be discharged through the liquid discharging valve 41 in separate and distinct charges, intermittently, or it may be discharged continuously before it entirely fills the condenser 27.

If during the operation of the apparatus valve 52 (see Fig. 2) is kept open and valves 53 and 54 are kept closed, my apparatus in liquefying will also partially separate the two gases, oxygen and nitrogen, (owing to the difference in temperature of their boiling points) by fractional distillation in evaporating principally the nitrogen of the liquefied air in the low-pressure holder 28; and consequently the overflow liquid drawn from the apparatus through discharge tube 31 will be very rich in oxygen, and the return flow of expanded gas or air leaving the system through valve 52 will be correspondingly rich in nitrogen.

At 36 I show an air-expansion valve, generally for use only in starting up, when an initial charge of liquid air for the evaporating vessel 28 is not obtainable; it is located above the condenser 27, or between it and the compressed-air supply. By opening this valve (36) a trifle, it acts as a throttled orifice or porous plug, and the compressed air in pipes 22, (at 45 to 50 atmospheres tension) is released or let down to substantially atmospheric pressure after it has passed through said valve; and in thus being released it drops in temperature in accordance with the well-known formula of the so-called "Joule-Thomson effect." The cooled expanded air is conducted back through said conduit (24) over the compressed air supply pipes 22. The air in these pipes and in condenser 27 is maintained at full pressure, the opening of the valve 36 not being so great as to reduce the pressure. As soon as the holder 28 is filled with a liquid-air charge, valve 36 may be closed and its further use dispensed with, if preferred.

If the liquefied air in the high-pressure condenser 27 is discharged therefrom as soon as condensed, then the latent heat of vaporization required, as released from pressure, would naturally be absorbed from the liquid itself, until its temperature falls to its boiling point $-313°$ F. The preferred method of operating, however, is to allow the liquefied air in the high-pressure submerged condenser 27 to remain therein until it is sub-cooled, or cooled after liquefaction, down from $-220°$ F., to $-312.6°$ F., the temperature of the liquid air surrounding the condenser in the insulated evaporating vessel 28. Then the liquid air in the condenser 27 as released from pressure and delivered to the evaporating vessel 28, will already be at $-312.6°$ F., and will not vaporize on being released. Evaporation, or fractional distillation of the liquid in the holder 28 will then go on continuously, for the difference in temperature between the evaporating liquid air in the holder 28 and the liquefying point of the cooled compressed air (40 to 45 atmospheres) in the condenser 27, is 93 degrees Fahrenheit; the latent heat, now at its maximum, being drawn entirely from both the cooled compressed air and the liquefied air in the condenser 27—rapidly liquefying the compressed air therein (without reduction of pressure) and sub-cooling the liquid as fast as produced. All of the vapor from the evaporated liquid air in the holder 28, at substantially atmospheric pressure, and at a temperature when evaporated of $-312.6°$ F., is carried back in the conduit 24, through the passage 40, and serves to cool the incoming supply of compressed air in the counter-current coils 22.

An important feature of the system is the fact that the evaporating holder or insulated reservoir 28 cannot be emptied; once charged it remains practically full of liquid air at substantially atmospheric pressure, during the operation of the apparatus, the surplus, or overflow alone being drawn from the reservoir. This surplus or output of liquid air, by reason of the high-pressure submerged liquefier herein shown, and other valuable features herein described, will be much more than heretofore obtained for the energy expended in this class of air-liquefying apparatus, or about 50% of all the air treated.

Having thus described my invention, what I claim as new and original and desire to secure by Letters Patent, is—

1. An apparatus for liquefying air, comprising in operative combination a liquefier; a liquid-air holder; and two discharging valves, delivering to said holder—one a compressed-air expansion valve, and the other a liquefied air discharging valve leading from the liquefier; said liquefier being arranged to be submerged in the liquid air produced or liquefied in said liquefier and delivered to said holder.

2. An apparatus for liquefying air, comprising in operative combination a high-pressure air-liquefying conduit; a low-pressure liquid-air evaporating conduit; and two pressure-releasing discharging valves—one a compressed air expansion valve, arranged to release from pressure and discharge only compressed air to said low-pressure liquid-air evaporating conduit, and the other a liquid-air valve, arranged to release from pressure and discharge air after it is liquefied, and from said high-pressure to said low-pressure conduit.

3. An apparatus for liquefying air, comprising in operative combination, a liquid-air evaporating inclosure; and air-liquefying condenser within said inclosure; and two pressure-releasing discharging valves—one a compressed-air expansion valve, arranged to release from pressure and discharge only compressed air, and the other a liquid-air valve, arranged to discharge air after it is liquefied; and both of said valves arranged to discharge from the same relatively high to the same relatively low pressure, and deliver to said evaporating inclosure.

4. An apparatus for liquefying air, comprising in operative combination, a liquid-air evaporating inclosure; two pressure-releasing discharging valves—one a compressed-air expansion valve, arranged to release from pressure only and discharge thereafter compressed air, and the other a liquid air valve, arranged to discharge air after it is liquefied; both of said valves being arranged to discharge from the same relatively high to the same relatively low pressure, and deliver to said evaporating inclosure; and a high-pressure air-liquefying condenser adapted to be submerged in the low-pressure liquefied air in said evaporating inclosure.

5. An apparatus for liquefying air consisting of one or more high-pressure pipes, and a low-pressure conduit inclosing the same having a liquid-air evaporating container; means for supplying compressed air to the system at one end of said pipe or pipes; and a high-pressure liquefying condenser at the other end, having a liquid-air discharging valve connecting said condenser with said container—arranged to be submerged in the liquid air previously produced therein; and an air-expansion or pressure-releasing air valve connected with said high-pressure pipe, between said condenser and said compressed-air supply—said valve being arranged to release from pressure and deliver air from said high-pressure pipe to said low-pressure conduit.

6. An apparatus for liquefying air, comprising in operative combination, a counter-current system, consisting of one or more inwardly delivering compressed-air pipes, longitudinally inclosed by an outwardly delivering expanded-air conduit opening to the atmosphere, having at its lower end an insulated liquid-air evaporating holder, provided with an overflow outlet, and arranged to hold liquefied air without loss except by evaporation or overflow therefrom; and a high-pressure liquefier within said evaporating holder, provided with an adjustable valve which connects said liquefier with said holder—said liquefier being connected with the inwardly delivering end of said compressed air pipe or pipes.

7. An apparatus for liquefying air, comprising in operative combination, a counter-current system consisting of one or more inwardly delivering compressed-air supply pipes longitudinally inclosed by an outwardly delivering expanded-air conduit, having at its lower or inlet end an insulated liquid air receptacle or holder, provided with an overflow outlet delivering outside the system; and a high-pressure liquefier within said liquid air holder, provided with an adjustable liquid-air dischargeing valve, the upper end of said liquefier being fixed to and connected with the inwardly delivering end of said compressed air supply pipes, and its lower end being connected with said insulated liquid-air receptacle, through said adjustable liquid air valve.

8. An apparatus for liquefying air, comprising in operative combination a counter-current system of one or more inwardly-delivering compressed-air supply pipes, longitudinally inclosed by an outwardly-delivering low-pressure expanded-air conduit, vented to the atmosphere, provided at its lower or inlet end with an insulated liquid-air evaporating holder, having an overflow outlet delivery outside the system; a high pressure condenser within said insulated liquid-air holder, connected with said compressed air supply pipe or pipes; and means providing for withdrawal from said high-pressure condenser of air after it is liquefied—the parts when in operation being so arranged that said condenser is constantly submerged in liquid air of substantially atmospheric pressure which was previously liquefied at relatively high compression and without reduction of pressure in said condenser.

9. An apparatus for liquefying air, comprising in operative combination one or more high-pressure pipes, and a low-pressure conduit or casing longitudinally inclosing the same—said conduit or casing having an insulated liquid-air evaporating holder at its lower end; means for supplying compressed air to one end of said high-pressure pipe or pipes, and a high-pressure liquefier connected with the other end thereof, within said evaporating holder; and an air-expansion valve between said liquefier and said means for supplying compressed air, arranged to deliver air from the high-pressure pipe or pipes to said low-pressure conduit, and expand the same therein.

10. An apparatus for liquefying air, comprising in operative combination, one or more high-pressure pipes, and a low-pressure conduit or casing longitudinally inclosing the same, vented to the atmosphere, and having at its lower end an insulated liquid-air evaporating holder arranged to allow liquid air to be evaporated therein; means for supplying compressed air to the system at one end of said high-pressure pipe or pipes, and a high-pressure liquefier fixed to and connected with the other end, within said holder; and a liquid air discharging valve connecting said high-pressure liquefier with said low-pressure liquid-air evaporating holder.

11. An apparatus for liquefying air, comprising in operative combination, counter-current high-pressure and low-pressure conduits—the first longitudinally inclosed by the last, and said low-pressure conduit having an insulated liquid-air evaporating holder at its lower end; means for supplying compressed air to the system at one end of said high-pressure conduit, and a high-pressure liquefier fixed to and connected with the other end, within said evaporating holder; and arranged to maintain the air delivered thereto without reduction of pressure; an air-expansion valve between said liquefier and said compressed air supply, arranged to deliver air from said high-pressure to said low-pressure conduit; and a liquid-air discharging valve connecting said liquefier with said holder.

12. In an air-liquefying apparatus the combination with a counter-current high-pressure and low-pressure conduit; of an air-expansion valve for utilizing the Joule-Thomson effect—said valve being connected with and fed from said high-pressure conduit and delivering to said low-pressure conduit; a liquid-air evaporating holder connected with said low-pressure conduit; and a still-air high-pressure condenser, or extension of said high-pressure conduit beyond said expansion valve, provided with a liquid-air discharging or pressure-releasing valve—said extension or still-air condenser being arranged to be submerged in the liquid air liquefied therein after the same has been released and discharged from said liquid-air pressure-releasing valve.

13. In an air liquefying apparatus the combination with a counter-current high pressure and low pressure conduit, and an air expansion valve for utilizing the Joule-Thomson effect; of a liquid-air evaporating holder connected with said low-pressure conduit; an air-liquefying high pressure condenser or extension of said high pressure conduit beyond said air expansion valve, and having a liquid air discharging valve, said extension of the high pressure conduit or air liquefying condenser being arranged to be submerged in the liquid air as produced in the apparatus,—the parts being so arranged that all vapor caused by evaporation of any portion of the successive low-pressure liquid air charges, passes into the low-pressure conduit and helps to cool the compressed air being supplied to the apparatus.

14. An apparatus for liquefying air, comprising an insulated low-pressure liquid-air evaporating vessel, and an air-liquefying high-pressure condenser within the same; in operative combination with means for supplying said condenser with air compressed to substantially its critical pressure; and means providing for releasing from pressure and discharging from said condenser, to said holder, the air after it is liquefied therein—said condenser being arranged to be submerged in the low-pressure liquid air in said holder as released from pressure and delivered thereto from said condenser.

15. An apparatus for liquefying air, comprising a low-pressure liquid-air evaporating holder, having an expanded air or vapor conduit delivering therefrom; in operative combination with a compressed-air supply pipe within said conduit, having an air-liquefying condenser at one end, in said holder; means at the other end of said pipe for supplying the same with air compressed to substantially its critical pressure; and means providing for releasing from pressure and discharging from said condenser to said holder, the air after it is liquefied in said condenser.

16. An air-liquefier comprising in operative combination, a low-pressure liquid-air evaporating vessel, having an outwardly delivering expanded air or vapor conduit connected with and delivering therefrom; an inwardly delivering compressed-air pipe within said conduit, arranged to be submerged at its lower end in the evaporating liquid air in said vessel; and an adjustable liquid-air pressure-releasing discharging valve connected with the outlet end of said compressed-air pipe, and releasing from pressure and delivering therefrom to said evaporating vessel the air after its is liquefied.

17. An apparatus for liquefying air, comprising an insulated low-pressure liquid-air evaporating vessel, vented to the atmosphere; and an air-liquefying high-pressure condenser within the same; in operative combination with means for supplying said condenser with air compressed to substantially its critical pressure; and means for releasing and delivering liquid air from said condenser to said evaporating vessel—whereby portions of the same are evaporated at substantially atmospheric pressure in said vessel by heat derived from air compressed substantially to or above its critical pressure in said condenser.

Signed at New York in the county of New York and State of New York this 3d day of Sept. A. D. 1906.

JAMES F. PLACE.

Witnesses:
JOHN A. INSLEE,
G. JOHNSON.